US008265696B1

(12) United States Patent
Verkama

(10) Patent No.: US 8,265,696 B1
(45) Date of Patent: Sep. 11, 2012

(54) DIGITAL TELECOMMUNICATION SYSTEM

(75) Inventor: Markku Verkama, Espoo (FI)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 09/830,028

(22) PCT Filed: Oct. 19, 1999

(86) PCT No.: PCT/FI99/00868
§ 371 (c)(1),
(2), (4) Date: Aug. 15, 2001

(87) PCT Pub. No.: WO00/24210
PCT Pub. Date: Apr. 27, 2000

(30) Foreign Application Priority Data

Oct. 21, 1998 (FI) .......................................... 982283

(51) Int. Cl.
*H04B 1/38* (2006.01)
(52) U.S. Cl. ........................ 455/560; 704/200; 370/357
(58) Field of Classification Search .................. 455/560, 455/445, 422.1, 517, 552.1, 553.1, 422, 557, 455/3.05, 450, 436; 370/401, 252, 522; 704/500, 704/270, 200, 201, 219, 275, 19, 262, 200.1, 704/223
See application file for complete search history.

(56) References Cited

U.S. PATENT DOCUMENTS

| 5,608,779 | A | | 3/1997 | Lev et al. | |
|---|---|---|---|---|---|
| 5,768,308 | A | | 6/1998 | Pon et al. | |
| 5,930,715 | A | * | 7/1999 | Chambers ...................... | 455/445 |
| 5,991,642 | A | * | 11/1999 | Watanabe et al. ............. | 455/560 |
| 5,995,923 | A | * | 11/1999 | Mermelstein et al. ......... | 704/219 |
| 6,006,189 | A | * | 12/1999 | Strawczynski et al. ........ | 704/270 |
| 6,009,383 | A | * | 12/1999 | Mony ............................. | 704/200 |
| 6,034,994 | A | * | 3/2000 | Yoon .............................. | 375/242 |
| 6,108,560 | A | * | 8/2000 | Navaro et al. .................. | 455/517 |
| 6,161,085 | A | * | 12/2000 | Haavisto et al. ............... | 704/201 |
| 6,172,974 | B1 | * | 1/2001 | Tseng et al. .................... | 370/357 |
| 6,173,183 | B1 | * | 1/2001 | Abu-Amara et al. .......... | 455/442 |
| 6,181,953 | B1 | * | 1/2001 | Shirota et al. .................. | 455/557 |
| 6,185,424 | B1 | * | 2/2001 | Pon et al. ........................ | 455/445 |
| 6,215,996 | B1 | * | 4/2001 | Fujita ........................... | 455/422.1 |
| 6,256,612 | B1 | * | 7/2001 | Vo et al. ........................ | 704/500 |
| 6,272,358 | B1 | * | 8/2001 | Brent et al. .................... | 455/560 |
| 6,295,302 | B1 | * | 9/2001 | Hellwig et al. ................ | 370/522 |
| 6,324,515 | B1 | * | 11/2001 | Rabipour et al. .............. | 704/500 |
| 6,363,339 | B1 | * | 3/2002 | Rabipour et al. .............. | 704/201 |
| 6,421,726 | B1 | * | 7/2002 | Kenner et al. .................. | 709/225 |
| 6,512,924 | B2 | * | 1/2003 | Sawada et al. ............... | 455/435.1 |
| 6,577,637 | B1 | * | 6/2003 | Sieppi ............................ | 370/401 |
| 6,597,702 | B1 | * | 7/2003 | Caugherty ..................... | 370/410 |
| 6,600,740 | B1 | * | 7/2003 | Valentine et al. .............. | 370/365 |

FOREIGN PATENT DOCUMENTS

| DE | 19516078 | 11/1996 |
|---|---|---|
| EP | 0909081 | 4/1999 |
| WO | WO 99/31911 | 6/1999 |

* cited by examiner

*Primary Examiner* — Kamran Afshar
*Assistant Examiner* — Khawar Iqbal
(74) *Attorney, Agent, or Firm* — Harrington & Smith

(57) ABSTRACT

A digital telecommunications system wherein the telecommunications centers of the calling and called terminal are arranged to perform handshaking concerning the speech codec used by the terminals. Depending on the link between the telecommunications centers, the telecommunications centers are arranged to connect call connections past a transcoder unit or to control the transcoder units to let encoded speech through without speech encoding operations in such a way that speech encoding and decoding are carried out only in the terminals. Handshaking between the telecommunications centers is carried out as outband signalling.

22 Claims, 2 Drawing Sheets

DIGITAL TELECOMMUNICATION SYSTEM

This application is the National Phase of International Application PCT/FI99/00868 filed Oct. 19, 1999 which designated the U.S. and that International Application was Published under PCT Article 21(2) in English.

BACKGROUND OF THE INVENTION

1. Field of the Invention

The invention relates to a digital telecommunication system wherein terminals and a telecommunication network comprise speech codecs, the speech codecs of the telecommunication network being located in a transcoder unit, from which a centre in the telecommunication network connects a transcoder to a speech connection, when required.

2. Description of Related Art

In present digital mobile communication systems, speech and data are transferred entirely in digital form, resulting in a uniformly good quality of speech. As far as the mobile communication network is concerned, the most limited resource on a transmission path is the radio path between mobile stations and base stations. To make the bandwidth required by one radio connection on the radio path as narrow as possible, speech encoding is employed in speech transmission to allow significantly lower transmission rates than in a fixed telephone network (PSTN, Public Switched Telephone Network), for example. In this case a speech encoder and decoder have to exits both in the mobile station and on the side of the fixed mobile communication network. On the network side, speech encoding functions may be placed alternatively either in a base station or a mobile switching centre. Speech encoders and decoders are typically located far away from the base station, in what is known as remote transcoder units, speech encoding parameters being transferred in the network between a base station and the transcoder unit. Thus a transcoder unit is a part of the logical transmission path in a fixed mobile communication network from a base station to a mobile switching centre.

In mobile terminated (MT) or mobile originated (MO) speech calls, a transcoder is connected to the speech connection on the network side for encoding (downlink) speech signals destined to a mobile station and decoding (uplink) speech signals originating from a mobile station. This is necessary if one of the parties to a call is a mobile station and the other a subscriber in a public telephone network (PSTN), for example.

In the case of mobile-to-mobile calls (MMC), the above described connection of a transcoder to a call results in the mobile switching centre connecting two transcoder units in series to each MMC call, two speech encodings and decodings being performed on the call in the above described manner. This so-called tandem coding is a problem in mobile communication networks, since it weakens speech quality owing to the extra speech encoding and decoding. Consequently, methods for preventing tandem coding have been developed in present digital mobile communication systems, for example the GSM system (Global System for Mobile communication). Methods of creating a tandem free function are based on signalling in a mobile communication network, the signalling comprising forwarding an indication to the transcoders upon set-up of an MMC call to the effect that they are to operate in a tandem coding prevention mode, whereby the transcoder does not at all encode or decode speech. Said signalling is transferred on a speech channel with speech parameters and other control information, i.e. as inband-signalling. In the tandem coding prevention mode, speech is encoded only in mobile stations and speech parameters are only transferred through the mobile communication network with slight changes from one base station via two tandem-connected transcoders to a second base station. This considerably improves the quality of speech as compared with a tandem coded MMC call.

In mobile communication networks, circuit-switched technology based on pulse code modulation (PCM) has been conventionally used in inter-MSC data transmission, i.e. PSTN or ISDN-based (Integrated Services Digital Network) network solutions. In this case, when a transcoder is in a tandem coding prevention mode, it combines control, synchronization and error correction information, for example, with speech parameters arriving from a mobile station via a base station, and adapts the data to PCM timeslots without transcoding. In mobile stations, encoded speech is adapted to a PCM channel such that one or more least significant bits of PCM samples constitutes a subchannel into which lower-rate speech encoded by the mobile station is multiplexed. These PCM samples and their subchannels are transferred to the receiving transcoder which sends the speech parameters further to the receiving base station either as such or making slight changes indicated by the control information. Inter-MSC data transmission on a PCM channel is described in greater detail in the Applicant's previous Finnish patent application 960,590.

The above manner of arranging tandem coding prevention is a well working method in mobile communication systems in which transcoders are part of the transmission path of the mobile communication network, and in which PCM technology is used in inter-MSC data transmission. However, in future third generation mobile communication systems, the intention is not to place transcoders as part of the transmission path, but they are to be placed in what is known as a transcoder pool, in association with a mobile switching centre, for example. In this case the mobile switching centre connects a transcoder to a call only if it is necessary, whereby the above manner of signalling a tandem coding prevention mode and adaptation of control information to speech parameters is not an advantageous way to implement a tandem free function. In third generation mobile communication systems, various alternative technologies are available for inter-MSC data transmission, including packet-switched connections not based on pulse code modulation. In this case it is not necessary to transmit inter-MSC signalling as part of a speech channel, which allows a simpler implementation of the tandem free function.

SUMMARY OF THE INVENTION

It is an object of the present invention to prevent tandem coding in calls between mobile stations by the use of simplified signalling better adaptable to new systems, in which the speech codec to be used is agreed upon between mobile switching centres.

The digital telecommunication system of the invention is characterized in that the centre of the calling terminal is arranged to perform handshaking with the centre of the called terminal concerning the speech codec used by the terminals, and the centres are arranged to establish call connections past the transcoder unit or to control the transcoder units to let the encoded speech through without speech encoding operations so that speech is encoded and decoded only in the terminals.

It is an essential idea of the invention that in a call between two mobile stations, the mobile, switching centres of the calling and called mobile stations use mutual signalling to agree upon the speech codec to be used on a call connection.

It is the idea of a preferred embodiment of the invention that, depending on the connection between the mobile switching centres, no transcoder is connected to the call connection. It is the idea of another preferred embodiment of the invention that said signalling is what is known as outband signalling. It is an advantage of the invention that the signalling of the invention simplifies implementation of the tandem free function, as transcoders are no longer automatically part of the transmission path. The signalling of the invention provides a common starting point for inter-MSC transmission of a call between two mobile stations irrespective of what kind of a connection is in use between the mobile switching centres. It is a further advantage of a preferred embodiment of the invention that, since, depending on the connection between the mobile switching centres, no transcoder is connected to the call connection, speech parameters do not have to be adapted to PCM frames as is the case in present transcoders. Neither do the transcoders necessarily have to support a speech codec to be used in calls between two mobile stations, and consequently mobile station-specific speech codecs can be rapidly taken into use in new systems. Still another advantage of the invention is that present network elements and signalling architecture in a mobile communication network can be used. New signaling messages, for example, do not have to be created for implementing the invention, but the invention can be implemented by modifying the contents of existing messages.

BRIEF DESCRIPTION OF THE DRAWINGS

In the following the invention will be described in greater detail with reference to the accompanying drawings, in which.

DETAILED DESCRIPTION OF INVENTION EMBODIMENTS

In this context, the term speech codec, or simply codec, refers to a functional entity which serves to encode or decode speech into a form required by a mobile communication system.

Figure 1:
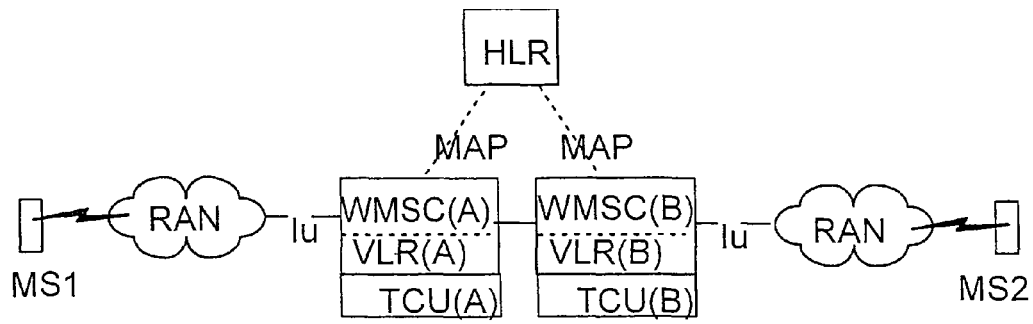
FIG. 1 is a simplified block diagram of an architectural model of a third generation mobile communication system.

FIG. 1 is a simplified block diagram of an architectural model of a third generation mobile communication system. The design of core network solutions in third generation mobile communication systems is based on the present European digital mobile communication system GSM. This allows the use of present core network solutions also in the future almost as such, and only changes required by new functions and services will be made. This provides considerable savings, since the expensive core networks do not have to be completely rebuilt. This is why reference is made in the examples of the present description, when applicable, to the present GSM system, since, for the most part, the principals of the signalling inside the core network will remain the same.

In FIG. 1, a mobile station (MS) communicates with a wideband mobile services switching centre (WMSC) via a radio access network (RAN). The radio network RAN comprises a base station system (not shown) comprising base transceiver stations (BTS) and radio network controllers (RNC), and signalling between them, but as far as the invention is concerned, the radio network may also be structurally different. Wideband CDMA technology, i.e. WCDMA technology, is used at the radio interface between the mobile station MS and the radio network RAN. However, the radio technology used is not relevant to the invention, and consequently the invention can also be used in systems applying other technologies. The radio network RAN communicates with the mobile switching centre WMSC over a radio interface Iu, for whose standards the ETSI (European Telecommunications Standards Institute) is currently drawing up recommendations. The mobile switching centres WMSC also have visitor location registers (VLR) and transcoder units (TCU). The mobile switching centres WMSC signal to a home location register (HLR) information on the user of the mobile station, i.e. the subscriber, concerning access rights, functions and charging, for example. MAP (Mobile Application Part) is the abbreviation generally used for referring to this signalling and it is described in greater detail in GSM recommendation 09.02 Mobile Application Part (MAP). Said subscriber data is also stored in the visitor location register VLR when a mobile station MS visits the area of the corresponding mobile switching centre WMSC.

In a preferred embodiment of the present invention, mobile switching centres agree by mutual handshaking signalling upon the speech codec to be used in an MMC call between two mobile stations, MS1 and MS2, whereupon, depending on the connection between the mobile switching centres, the call is either connected past the transcoder unit or the transcoder unit is controlled to let the call pass through without speech encoding functions on the mobile communication network side in such a manner that speech is encoded and decoded only in the mobile stations MS1 and MS2. According to the invention, this is achieved by indicating the speech codecs supported by the mobile station MS1 of subscriber A to the mobile switching centre WMSC(A) of subscriber A. The mobile switching centre WMSC(A) stores this information in the visitor location register VLR(A), attaches said information as part of a routing information inquiry to be sent to the home location register HLR, and the home location register HLR relays the information further to the mobile switching centre WMSC(B) of subscriber B. Subscribers A and B may also be attached to the same mobile switching centre, in which case the routing information inquiry does not have to be sent via the home location register HLR, but it can be made via the visitor location register VLR in association with the mobile switching centre WMSC. The speech codecs supported by the mobile station MS2 of subscriber B are also indicated to the mobile switching centre WMSC(B) of subscriber B, and the mobile switching centre WMSC(B) stores this information in the visitor location register VLR(B). The mobile switching centre WMSC(B) of subscriber B selects a codec suitable for both mobile stations, MS1 and MS2, informs the mobile switching centre WMSC(A) of subscriber A, and stores the information on the codec to be used in its database VLR(B).

In a preferred embodiment of the present invention, an MMC call between two mobile stations MS1 and MS2 can be so switched that no transcoder at all is connected to the connection. This is carried out as follows: after the above described signalling, the mobile switching centres having agreed upon the speech codec to be used on the call connection, the mobile switching centre WMSC(A) checks the transmission technology the connection uses between the mobile switching centres WMSC(A) and WMSC(B). If pulse code modulation is not used on said connection, i.e. the connection is packet-switched, for example, then, in response to this, the mobile switching centre WMSC(A) connects no transcoder to the connection. Alternatively, the connection between the mobile switching centres WMSC(A) and WMSC(B) may be a PCM-switched PSTN or ISDN connection. In this case the mobile switching centre WMSC(A) controls the transcoder unit TCU(A), in a manner known per se, to switch the call connection via the transcoder without speech encoding functions in such a way that speech is encoded and decoded only in the mobile stations MS1 and MS2.

Third generation mobile stations use various speech 1codecs, and in MMC calls, to which no transcoder is connected in the above manner, it is essential that mobile stations use the same kind of speech codec. According to a preferred embodiment of the invention, the speech codec to be used is indicated, when required, to both mobile stations before the call is switched. A default codec to be used by the mobile stations MS1 and MS2, unless otherwise notified, is preferably defined. Similarly, the visitor location registers VLR(A) and VLR(B) comprise information on the default speech codecs. Should the above handshaking signalling result in the use of another speech codec on the call connection than is the default set for the mobile stations MS1 or MS2, information on this is forwarded to the mobile switching centres WMSC (A) and WMSC(B). Finally, when the call is set up, the mobile switching centres WMSC(A) and WMSC(B) inform the mobile stations MS1 and MS2, respectively, which codec to use, should it not be the default codec.

In accordance with a second preferred embodiment of the invention, handshaking signalling concerning the speech codec to be used is carried out as part of physical call set-up. In this case the speech codec to be used is notified to the mobile switching centre WMSC(A) in a reply message to a call set-up message, whereupon the mobile switching centres WMSC(A) and WMSC(B) inform, when required, the mobile stations MS1 and MS2 about the codec to be used, and control the transcoder units TCU(A) and TCU(B) in a manner required by the transmission connection, as was described above.

In third generation mobile communication networks, inter-WMSC traffic is designed to be carried out by packet-switched connections, when possible. In other words, it can be preferably carried out by means of wideband ATM network technique (Asynchronous Transfer Mode), for example. ATM is a general-purpose transfer mode which combines the advantages of circuit-switched and packet-switched data transmission. ATM is based on cell-switched data transmission, the data to be transmitted being split into bits having a given length, i.e. cells. Telecommunication applications which require constant capacity or delay and which have conventionally used a circuit-switch connection, are prioritized in filling the cells. Applications not requiring constant capacity or delay, transmit their data in the remaining cells in the same way as on a packet-switched connection.

Figure 2:
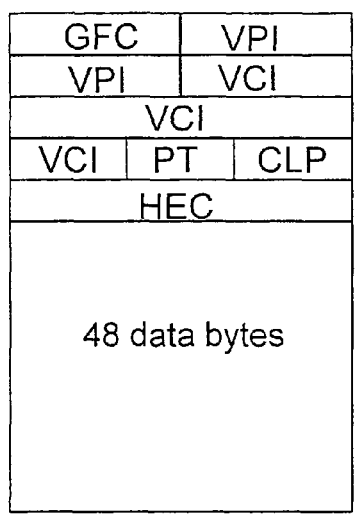
FIG. 2 shows a transport cell according to a packet-switched trans-mission method which can be utilized in a preferred embodiment of the invention.
Figure 3:
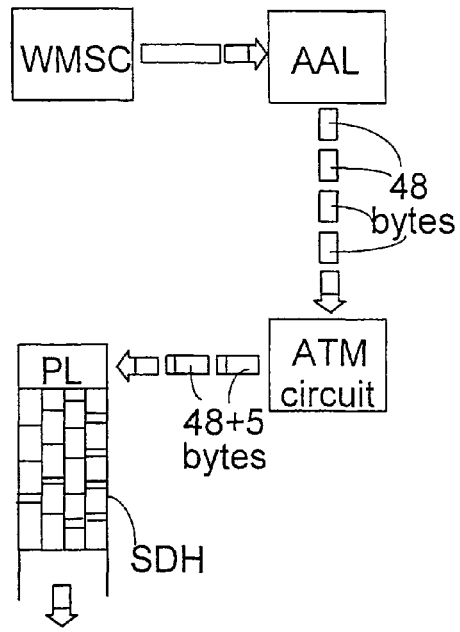
FIG. 3 shows an adaptation protocol function of a packet-switched transmission method which can be utilized in a preferred embodiment of the invention.

An ATM cell comprises 53 bytes, of which 48 bytes are payload and 5 bytes are reserved for header data. FIG. 2 shows an ATM cell and its header fields. A GFC field (Generic Flow Control) is used in connection flow control. A virtual path identifier (VPI) indicates to the ATM network switches the route of the cell in the network, cells having the same VPI value being always transmitted to the same address. A virtual channel identifier (VCI) operates like the VPI, and both VPI and VCI values are used in defining a logical channel, allowing the simultaneous connection of whole channel groups to the backbone network. Hereby the VPI between two functional points can be agreed upon among service providers, and yet the service user is able to define the VCI values. The type of payload is defined in a PT field (Payload Type). A CLP field (Cell Loss Priority) allows traffic to be divided into two classes, resulting in the cells whose CLP bit=1 being destroyed first when the network gets congested. An HEC field (Header Error Correction) is used to ascertain the correctness of header bits. ATM technique can be utilized in various applications, and therefore the need has arisen to define adaptation protocols (ML, ATM Adaptation Layer) for different application types. FIG. 3 shows an ML function in which a data packet originating from a mobile switching centre, for example, is split in the ATM adaptation function into 48-byte cells, which are further applied to ATM circuits, which attach a five-byte header to the cells. In the physical access layer these cells are further set into an SDH form (Synchronous Digital Hierarchy), which specifies in optical fibre-based transmission systems how data streams at different rates are transmitted in the backbone network. The ATM backbone network is composed of ATM switches, which are linked together by high-rate connections, usually optical fibres, and to which local networks, mobile switching centres, telephone exchanges or video devices, for example, can be further connected. In present ATM networks, the transfer rate may vary, depending on the connection, between 64 kbps and 622 Mbps, but in the future several Gbps will be reached. As to a more precise description of the ATM technique, reference is made to 'Asynchronous Transfer Mode: Atm Architecture and Implementation'; J. Martin, K Chapman, J. Leben; Prentice Hall, USA; ISBN: 0135679184.

During the last few years, the use of the Internet has grown exponentially and become more versatile, new services and options being continuously developed. The TCP/IP protocol (Transmission Control Protocol/Internet Protocol) acts as the data transmission protocol in the Internet, the special advantage being its independence of different device or software architectures, which makes it the most generally used network protocol in the world, especially in local networks. In Internet-based networks, the IP protocol is the actual network protocol which serves to route an addressed IP message from a source station to a destination station. A transport protocol, either TCP or UDP (User Datagram Protocol), is run above the IP network protocol. The transport protocol attends to the transfer of data packets from a source port to a destination port. The TCP offers reliable connections to applications, i.e. the TCP splits the data from the applications into IP packets, sees to it that the data arrives intact and in the right order, resends lost or damaged data packets and also attends to flow control. The UDP, in turn, is a lighter transport protocol than the TCP and does not answer for the arrival or correctness of data packets. This makes the UDP an unreliable transport protocol, which leaves error and correctness checks to the application program, but is better suited to services requiring real-time performance.

The generality of Internet-based networks and the inexpensive, in local networks even free data transmission, they offer, have aroused great interest in switching also voice calls via IP networks. This would also allow inter-MSC data to be transmitted by means of IP networks. The device and system solutions thus far developed for transmitting conventionally circuit-switched voice calls in a packet-switched IP network are rather unreliable and incompatible. To make Internet call systems compatible, a standard (VoIP, Voice over IP) is being created, for example for determining the compatibility of devices, quality of service, and routing calls in IP networks.

Figure 4:
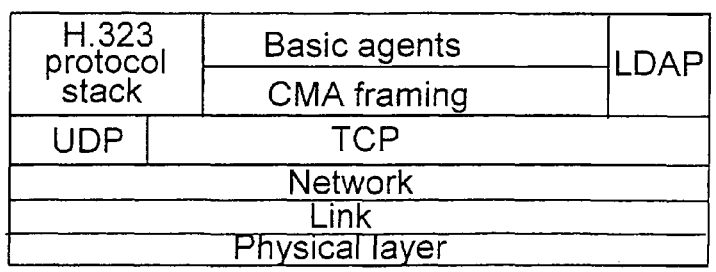
FIG. 4 shows protocol layers of a packet-switched transmission method which can be utilized in a second preferred embodiment of the invention.

FIG. 4 shows a VoIP standard recommendation for the protocol stack in Internet call systems. Either the TCP or the UDP is run above the IP network protocol, depending on the application. At the next layer, an H.323 protocol stack is placed; a standard defined by the ITU (International Telecommunication Union) for packing voice and video image used in video conference programs and for controlling calls. The H.323 is used for call set-up and adaptation negotiations, and for reserving a connection required by real-time speech in an IP network. Call control and functions and services associated therewith, such as choice of transfer protocol, optional speech encoding, voice activity detection (VAD) and DTMF functions, are carried out in a CMAS unit (Call Management Agent System) comprising CMA framing and agents for each function (Basic Agents). The CMAS utilizes the LDAP (Lightweight Directory Access Protocol) for dealing with the name service in telecommunications between different types of networks and file servers without the transport protocol having to deal with it. An external telephone network, for example a mobile telephone network, can be linked to the VoIP system by means of an H.323 gateway server (not shown). In fact, a mobile telephone operator is able to best utilize the VoIP system in his own local or wide area network (LAN/WAN), allowing the operator to manage traffic both in the network and in the H.323 gateway servers.

Data transmission protocols based on the ATM and IP technologies are presented herein by way of example as data transmission technologies advantageous to the implementation of the invention. They use packet-switched data transmission, i.e. data frames are not adapted to PCM timeslots. This provides the advantage that, as no adaptation to PCM frames is required, a call can be set up completely without transcoders. Inter-MSC handshaking signalling can also be carried out as outband signalling, allowing the handshaking signalling to be carried out separately from call set-up, for example directly in inter-MSC connection set-up. It is obvious that the mobile communication system of the invention can be implemented by the use of any corresponding packet-switched data transmission technology, e.g. by means of xDSL technology (Digital Subscriber Line).

Figure 5:
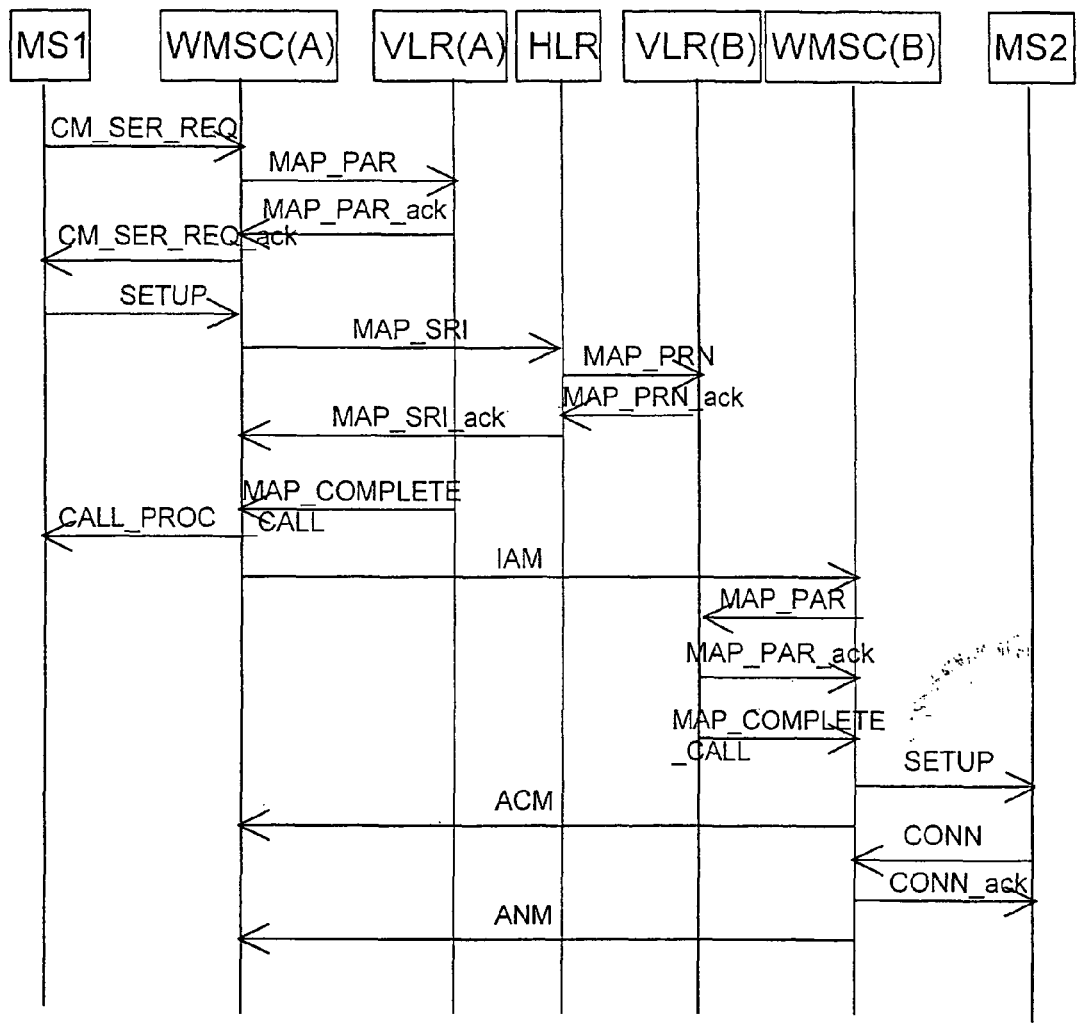
FIG. 5 shows call set-up signalling according to some preferred embodiments of the invention.

In the following, a preferred embodiment of the invention will be described with reference to FIG. 5. FIG. 5 only shows the relaying of messages relevant to the implementation of the invention in a mobile communication system. Consequently, between the messages described, messages may be relayed that are not essential to the implementation of the invention. The speech codecs supported by the mobile station MS1 of subscriber A are indicated to the mobile switching centre WMSC(A). This may preferably take place during call set-up signalling as the mobile station MS1 requests connection set-up of the mobile communication network, whereby the mobile switching centre WMSC(A) can store the data on the speech codecs supported by the mobile station MS1 in the visitor location register VLR(A). For data transmission a classmark identifier can also be used, which is known for example from the GSM system and comprises data on the properties of a mobile station and which the mobile station sends to the network when requested or when the mobile station wants to change classmark classes. Similarly, the speech codecs supported by the mobile station MS2 of subscriber B are indicated to the mobile switching centre WMSC(B). Relaying call set-up signalling and classmark identifiers is described in greater detail in GSM recommendation 04.08 Mobile radio interface layer 3 specification.

When subscriber A initiates call set-up, the mobile station MS1 sends via the radio network RAN to the mobile switching centre WMSC(A) a call setup message, on the basis of which the mobile switching centre WMSC(A) identifies the called subscriber B as a mobile station. Subscriber B is identified on the basis of a numerical analysis, the identification being known per se from optimal call routing (OR), for example. In accordance with FIG. 5, the mobile switching centre WMSC(A) receives a CM_SER_REQ message (Connection Management_Service_Request), for example, as a sign of initiation of call set-up. In order for the call to be able to be routed to subscriber B via the right mobile switching centre WMSC(B), the mobile switching centre WMSC(A) sends to the home location register HLR a routing information inquiry MAP_SRI (MAP_Send_Routing_Information), to which is attached information on the speech codecs supported by the mobile station MS1, preferably in the preference order of the mobile station MS1. The preference order serves to always use the default speech codecs of mobile stations, as far as is possible. The home location register HLR attaches this information further aspart of a roaming number inquiry sent to the visitor location register VLR(B) of the mobile switching centre WMSC(B), MAP_PRN (MAP_Provide_Roaming_Number). The mobile switching centre WMSC(B) selects from the speech codecs informed the one that is suitable for the mobile station MS2, making the selection preferably in the preference order given by the mobile station MS1. Information on the speech codec selected is stored in the visitor location register VLR(B) and attached to a roaming number reply MAP_PRN_ack sent to the home location register HLR. The home location register HLR further attaches the information to a reply message to the routing information inquiry, MAP_SRI_ack, which is sent to the mobile switching centre WMSC(A) which stores the information in the visitor location register VLR(A).

As call set-up progresses, the mobile switching centre WMSC(B) sends to the visitor location register VLR(B) an inquiry of necessary authentication and encryption information. The corresponding inquiry for subscriber A is already made at the initial stage of call set-up in a message MAP_PAR (MAP_Process_Access_Request). To initiate actual call switching, both visitor location registers VLR(A) and VLR(B) issue to the mobile switching centres WMSC(A) and WMSC(B), respectively, a command MAP_COMPLETE_CALL, to which information on the speech codec selected for that call connection is attached. If the speech codec selected for the call connection is not the default speech codec of mobile stations MS1 or MS2, the mobile switching centres transmit information on the selected speech codec further to the mobile stations. Then, in the MO section of the call, the WMSC(A) indicates the information to the MS1 in a message CALL_PROC and, similarly, in the MT section of the call, the WMSC(B) indicates the information to the MS2 in a SETUP message. In response to this, both mobile stations MS1 and MS2 connect the same speech codec to the call.

Now, if packet-switched ATM technology, for example, is used on the connection between the mobile switching centres WMSC(A) and WMSC(B) instead of data transmission based on circuit-switched PCM technology, no transcoder at all is connected to the connection, but the speech frames encoded by the mobile station MS1 by means of the above AAL function of the ATM, suitable for the mobile switching centre, are placed in ATM cells. Similarly, when the VoIP technology is used, speech frames are placed by means of the H.323 gateway server into H.323 frames complying with the VoIP standard. In this case, as far as the fixed mobile communication network is concerned, speech frames are transmitted in the exact speech frame form encoded by the mobile station. If again the inter-MSC connection utilizes the PSTN or ISDN technology, the mobile switching centres connect transcoders to the connection and control these to adapt the speech frames encoded by the mobile station to the PCM form required by the PSTN and ISDN technologies, however, without transcoding. In this case the adaptation function carried out by the transcoders corresponds to the tandem free function of the known GSM technology.

A second preferred embodiment of the invention can be implemented in a mobile communication system allowing direct signalling on an inter-MSC connection. One such signalling model is what is known as ISUP signalling (ISDN User Part), usable in inter-MSC signalling. ISUP signalling is described in greater detail in the ITU standard recommendations Q.721-Q.764. In accordance with FIG. 5, in inter-MSC signalling three ISUP messages are used: IAM (Initial Address Message), ACM (Address Complete Message) and ANM (Answer Message). In accordance with the invention, the speech codecs supported by subscriber A are then notified to the mobile switching centre WMSC(B) of subscriber B in an IAM message, allowing non-defined spare values of the IAM message to be advantageously utilized. The mobile switching centre WMSC(B) of subscriber B sends an ACM message to the mobile switching centre WMSC(A) after a SETUP message sent to the mobile station MS2. The mobile switching centre WMSC(B) and the mobile station MS2 set up the connection by messages CONN (Connect) and CONN_ack. The mobile switching centre WMSC(B) selects the speech codec in the same way as was described above and attaches information on the speech codec selected as part of an ANM message sent to the mobile switching centre WMSC (A).

In the present embodiment of the invention, information on the speech codec selected is not transferred to the mobile switching centre WMSC(A) of subscriber A until the physical transmission path has been set up. Consequently, in an MMC call between two mobile stations MS1 and MS2, the transcoder units in the mobile switching centres are not controlled to switch the call past the transcoder unit or to control the transcoder unit to let the call through without speech encoding operations until after connection set-up. In other respects than the handshaking signalling of the speech codecs and the control of the transcoder units, this embodiment of the invention can be implemented in the same way as was described above. The implementation of this embodiment of the invention also allows the use of any other inter-MSC signalling, such as TUP signalling (Telephone User Part).

The invention and the signalling associated therewith have been described herein according to potential embodiments of the invention and only to the degree that the description of the signalling is relevant to the implementation of the invention. As to a more precise description of signalling, particularly as to functions under malfunction, reference is made to the GSM recommendation 09.02 Mobile Application Part (MAP), Chapter 18, 'Call Handling Procedures' (v. 4.18.0).

Even though the invention has been described herein with mobile communication systems as the basis, the principles of the invention can be implemented in any corresponding telecommunication system in which centres perform handshaking concerning speech codecs used by terminals. The invention is particularly applicable in mobile communication systems, since said environment uses a plurality of different terminals in which a plurality of different speech encoding methods are used, the interfaces between the terminals and the network being accurately standardized.

The figures and the related specification are only intended to illustrate the present invention. It is obvious to a person skilled in the art that the details of the invention may be implemented in a variety of ways within the scope of the attached claims.

The invention claimed is:

1. A digital telecommunications system comprising:
   (a) a first mobile switching centre configured to enable speech communication between a plurality of terminals, the first mobile switching centre being associated with a calling terminal and including a first transcoder unit;
   (b) a second mobile switching centre configured to enable speech communication between a plurality of terminals, the second mobile switching centre being associated with a called terminal and including a second transcoder unit,
      wherein the first and second transcoder units each include speech codecs, in which each of the speech codecs comprises an encoder unit and a decoder unit,
      wherein the calling and the called terminal each include a respective plurality of supported speech codecs, and
      wherein the calling terminal and the called terminal are each arranged to provide information regarding the availability of said respective plurality of supported speech codecs to their associated mobile switching centre;
   (c) the first mobile switching centre being configured to perform handshaking with the second mobile switching centre, the handshaking including indication of the availability of the respective plurality of supported speech codecs supported by the calling terminal,
      wherein the second mobile switching centre is configured to select a compatible speech codec selected from said respective plurality of available and supported speech codecs of each of the calling and the called terminals to be usable commonly by both the calling and called terminals and convey to the first mobile switching centre information indicating the selected compatible codec, and
      wherein the first mobile switching centre is configured to convey to the calling terminal the selected compatible speech codec and to establish call connections that bypass one or more of the transcoder units or, to control the transcoder units to transmit encoded speech between the called and calling terminals without performing speech encoding operations so that speech is encoded and decoded only in the called and calling terminals.

2. The telecommunications system of claim 1, wherein the telecommunication system is a mobile communication system in which the terminals include mobile stations, and the telecommunication system further comprises a mobile communication network.

3. The telecommunication system of claim 1, wherein:
   the mobile switching centre includes a subscriber database configured to maintain subscriber data associated with a mobile subscriber, and the subscriber data includes information indicating the speech codecs supported by a mobile station associated with the mobile subscriber.

4. The telecommunication system of claim 1, wherein the handshaking is performed as outband signalling.

5. The telecommunication system of claim 4, wherein the first and second mobile switching centres are configured to perform the handshaking in association with a routing information inquiry issued in response to a determination that the called terminal is a mobile subscriber.

6. The telecommunication system of claim 5, wherein:
   the first mobile switching centre is configured to send the routing information inquiry including information associated with the availability of said respective plurality of supported speech codecs supported by the calling terminal, and the second mobile switching centre is configured to send information associated with the selected compatible speech codec in a reply message to the routing information inquiry.

7. The telecommunication system of claim 6, wherein the routing information inquiry and reply message to the routing information inquiry are configured to pass via a home database of the called terminal.

8. The telecommunication system of claim 4, where the first and second mobile switching centres are configured to perform the handshaking in association with inter-MSC signaling.

9. The telecommunication system of claim 8, wherein:
the first mobile switching centre is configured to send a message requesting connection set-up, the message including information indicating the respective plurality of supported speech codecs supported by the calling terminal, and the second mobile switching centre is configured to send information associated with the selected compatible speech codec associated with the call connection, in a reply message to the connection set-up message.

10. The telecommunication system of claim 8, wherein the inter-MSC signalling is ISUP signalling.

11. The telecommunication system of claim 8, wherein the message requesting connection set-up is an IAM message according to ISUP signalling.

12. The telecommunication system of claim 8, wherein the reply message to the connection set-up message is an ANM message according to ISUP signalling.

13. The telecommunication system of claim 1, wherein, when required, at least one of the first and second mobile switching centres is configured to notify the associated calling and called terminal of the speech codec it has to use as the result of handshaking.

14. The telecommunication system of claim 13, wherein at least one of the first and second mobile switching centres is configured to notify the associated terminal of the speech codec to be used if it is not a default speech codec of the associated terminal.

15. The telecommunication system of claim 1, wherein:
a pulse code modulated digital link exists between the first and second mobile switching centres, and the first and second mobile switching centres are configured to control their respective transcoder units to adapt an encoded speech signal to one or more least significant bits of PCM samples without transcoding.

16. The telecommunication system of claim 1, wherein:
the system is configured to support a packet-switched link between the first and second mobile switching centres, and the first and second mobile switching centres are configured to connect a call connection that bypasses at least one of the transcoder units.

17. An apparatus, comprising:
a mobile switching centre in a digital telecommunication network configured to receive information regarding availability of a plurality of supported speech codecs of a calling terminal, and to connect a transcoder located in a transcoder unit to a call connection when required, wherein the mobile switching centre is configured:
to perform handshaking with another mobile switching centre associated with a called terminal, the handshaking including indication of the availability of the plurality of speech codecs supported by the calling terminal associated with the mobile switching centre,
to receive from said another mobile switching centre information indicating a speech codec of the called terminal, wherein the speech codec of the called terminal was determined by the another mobile switching centre to be compatible with one of the available plurality of supported speech codecs, and
to convey to the calling terminal the received information indicating the speech codec and connect a call connection between the calling and called terminals that bypasses the transcoder unit or to control the transcoder unit to transmit encoded speech without performing speech encoding operations in such a way that speech encoding and decoding are only performed in the calling and called terminals.

18. A method, comprising:
receiving by a mobile switching centre in a digital telecommunication network information from a calling terminal regarding availability of a plurality of supported speech codecs of the calling terminal;
performing handshaking by the mobile switching centre with another mobile switching centre associated with a called terminal, the handshaking including indication of the availability of the plurality of speech codecs supported by the calling terminal associated with the mobile switching centre;
receiving from said another mobile switching centre information indicating a compatible speech codec of the called terminal, wherein the speech codec of the called terminal was determined by the another mobile switching centre to be compatible with one of the available plurality of supported speech codecs,
conveying by the mobile switching centre to the calling terminal information indicating the selected compatible speech codec; and
connecting by the mobile switching centre a call connection between the calling and called terminals that bypasses a transcoder unit in the mobile switching centre or controls the transcoder unit to transmit encoded speech without performing speech encoding operations in such a way that speech encoding and decoding are only performed in the calling and called terminals.

19. A non-transitory computer-readable storage medium storing a computer program which when run on a computer, causes the computer to perform the method of claim 18.

20. An apparatus, comprising:
a mobile switching centre in a digital telecommunication network configured to perform handshaking with another mobile switching centre associated with a calling terminal, the handshaking including indication of availability of a plurality of speech codecs supported by the calling terminal, wherein the mobile switching centre is configured:
to receive at the mobile switching centre from a called terminal information regarding availability of a plurality of supported speech codecs of the called terminal;
to select by the mobile switching centre a compatible speech codec from said respective plurality of available and supported speech codecs of each of the calling and called terminals to be useable commonly by both the calling and called terminals;
to convey by the mobile switching centre to the another mobile switching centre the selected compatible speech codec; and
to connect by the mobile switching centre a call connection between the calling and called terminals that bypasses a transcoder unit in the mobile switching centre or controls the transcoder unit to transmit encoded speech without performing speech encoding operations in such a way that speech encoding and decoding are only performed in the calling and called terminals.

21. A method, comprising:

performing handshaking by a mobile switching centre in a digital telecommunication network with another mobile switching centre associated with a calling terminal, the handshaking including indication of availability of a plurality of speech codecs supported by the calling terminal;

receiving at the mobile switching centre from a called terminal information regarding availability of a plurality of supported speech codecs of the called terminal;

selecting by the mobile switching centre a compatible speech codec from said respective plurality of available and supported speech codecs of each of the calling and called terminals to be useable commonly by both the calling and called terminals;

conveying by the mobile switching centre to the another mobile switching centre the selected compatible speech codec; and connecting by the mobile switching centre a call connection between the calling and called terminals that bypasses a transcoder unit in the mobile switching centre or controls the transcoder unit to transmit encoded speech without performing speech encoding operations in such a way that speech encoding and decoding are only performed in the calling and called terminals.

22. A non-transitory computer-readable storage medium storing a computer program which when run on a computer, causes the computer to perform the method of claim 21.

* * * * *